Dec. 2, 1969
J. P. McGOVERN
3,481,579
VALVE ASSEMBLY
Filed Nov. 5, 1964
3 Sheets-Sheet 1
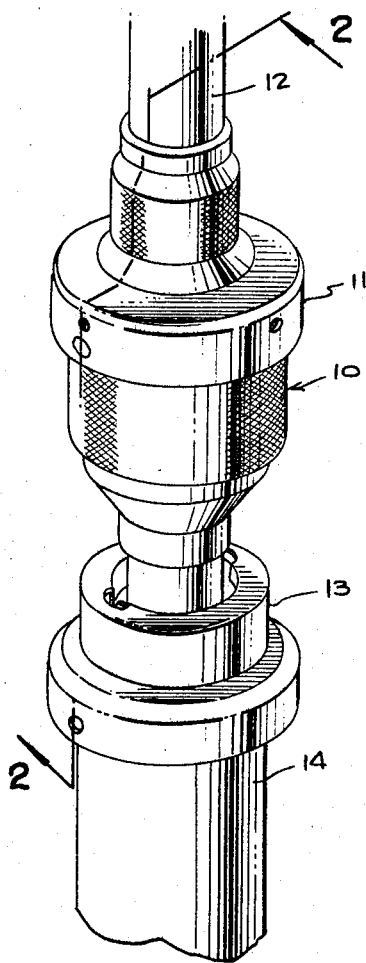
Fig-1
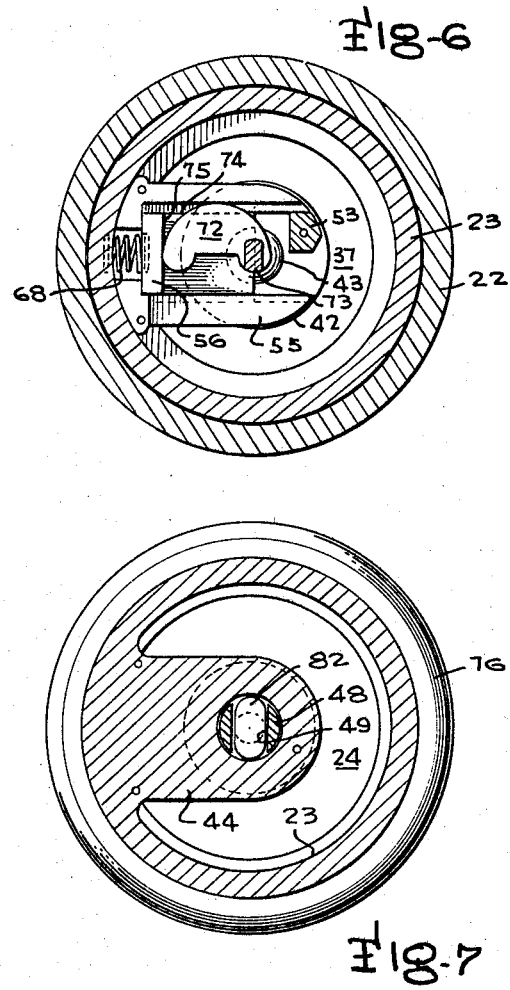
Fig-6
Fig-7
INVENTOR
JOHN P. McGOVERN
BY Mason, Fenwick & Lawrence
ATTORNEYS Dec. 2, 1969  J. P. McGOVERN  3,481,579
VALVE ASSEMBLY
Filed Nov. 5, 1964  3 Sheets-Sheet 2
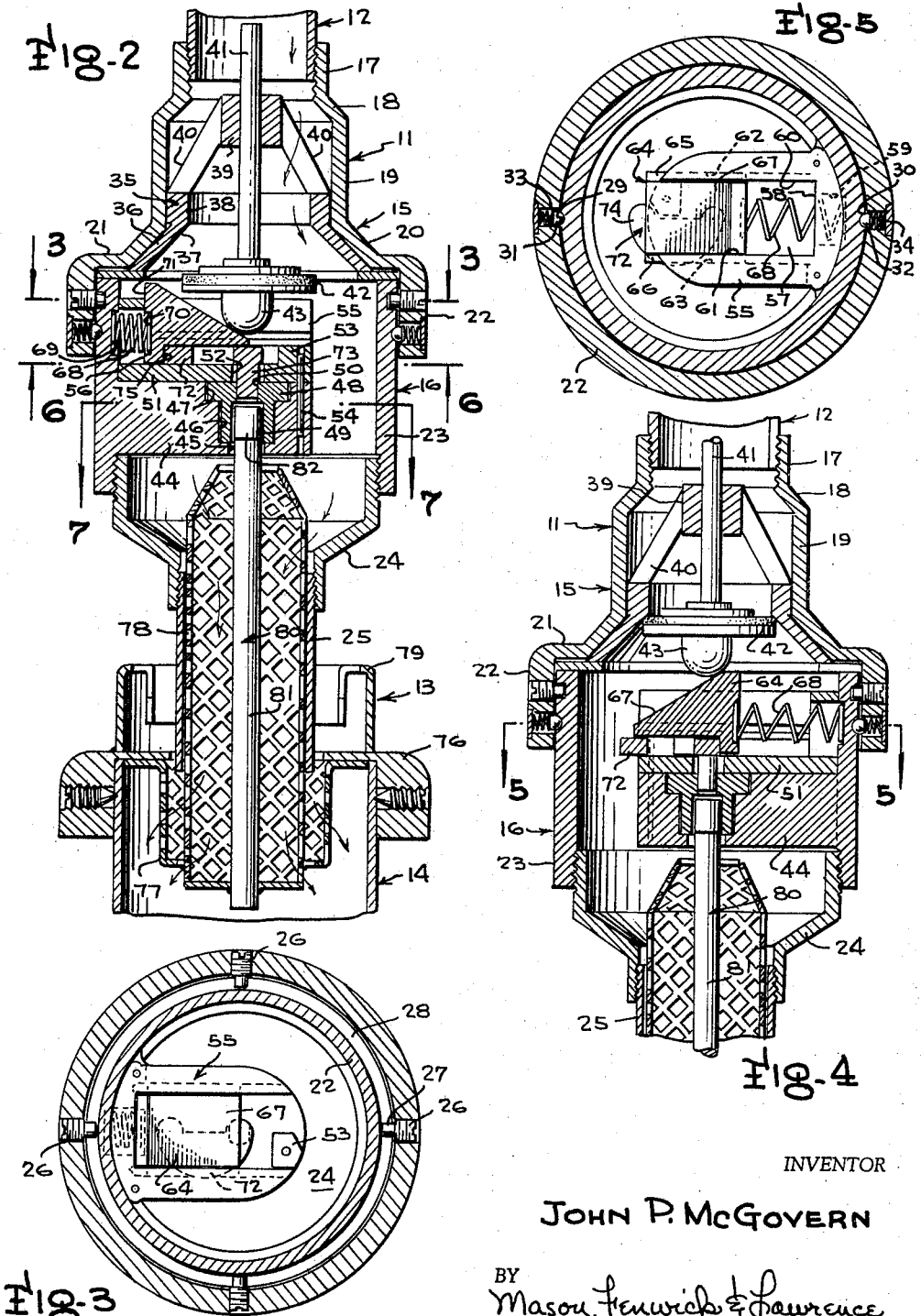
INVENTOR
JOHN P. McGOVERN
BY Mason, Fenwick & Lawrence
ATTORNEYS

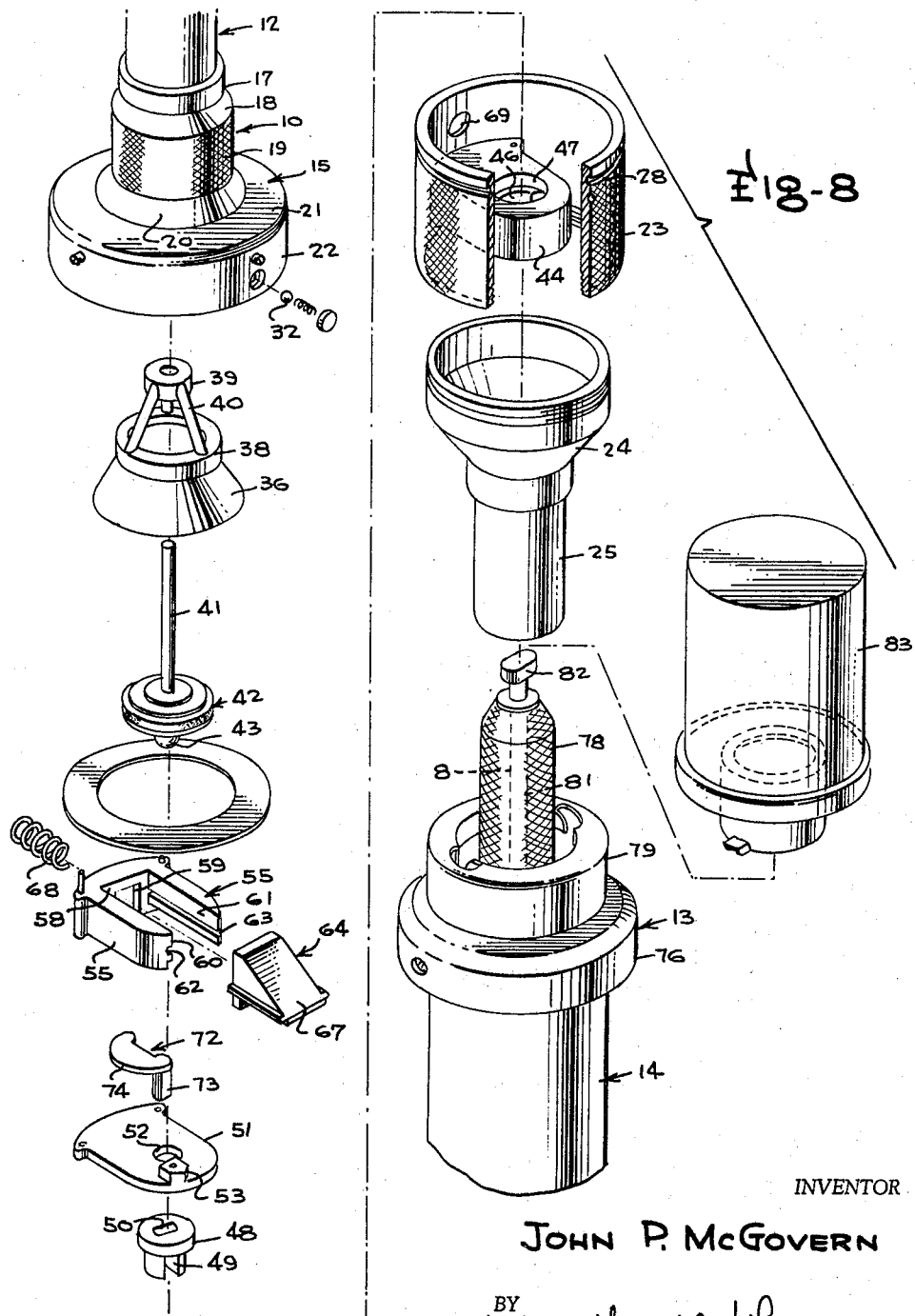

United States Patent Office 3,481,579
Patented Dec. 2, 1969

3,481,579
VALVE ASSEMBLY
John P. McGovern, Brookfield, Ill.
(375 Blythe Road, Riverside, Ill. 60546)
Filed Nov. 5, 1964, Ser. No. 409,097
Int. Cl. F16k *31/524, 5/02;* F16l *29/00*
U.S. Cl. 251—148      11 Claims

ABSTRACT OF THE DISCLOSURE

A valve assembly including engageable first and second body members, the body members having communicable fluid passageways providing a fluid passageway through the assembly when the body members are engaged, the first body member having a valve in the passageway thereof, movable means mounted on the first body member including means for biasing the valve into the closed position, operative only upon being rendered operable and actuation thereof, for deactivating the biasing means, means mounted on the second body member operatively engageable with the movable means when the body members are engaged for rendering the movable means operable and means mounted on the first body member operatively engageable with the movable means for actuating the movable means to deactivate the biasing means when the movable means has been rendered operable.

---

This invention relates to a valve assembly, and more particularly to a valve assembly suitable for dispensing fluids such as motor vehicle fuels and the like, which is adapted to be operated only by authorized users.

In many types of business concerns which employ a number of motor vehicles, often it is desirable to have available a supply of motor fuel on the premises of such concerns for supplying their own vehicles at the business site, as opposed to having the vehicle operators purchase fuel individually from retail dealers. This particularly has been found to be desirable, in that it permits the purchase of motor fuel from distributors in bulk quantities by the owners of the vehicles, which usually results in a reduction in the cost of the fuel. Additional savings and time also are realized with such an arrangement, in that it eliminates the necessity of individual trips by the vehicle operators to retail dealers for the purchase of motor fuel.

In the past, a substantial number of owners of a number of vehicles have found it to be impractical and uneconomical to maintain fuel supply facilitates on their premises, in that normally such facilities had to be left unattended, which resulted in considerable unauthorized use and often pilferage. It has been found, however, that the unauthorized use and pilferage of motor fuel stored on business premises can be prevented by employing a novel valve in the dispensing lines of the fuel storage tanks, which normally would be locked in the closed position. Such valves would be adapted to be opened only by connecting the dispensing lines to the fuel tanks of authorized vehicles, which were provided with key members operatively engageable with the valve in the dispensing line for unlocking the valve.

It, therefore, is the principal object of this invention to provide a novel valve assembly.

Another object of this invention is to provide a novel valve assembly which can be used in connection with a dispensing line of a fuel storage tank which is adapted to be operated only by selected authorized users.

A further object of this invention is to provide an improved valve assembly adapted to be used in connection with dispensing lines of fuel storage tanks which normally is maintained in the closed position, which is adapted to be opened to permit opening only when connected to the fuel tanks of selected vehicles.

A still further object of this invention is to provide a novel valve assembly adapted for use with the dispensing line of a fuel storage tank, which normally is maintained in the closed position, and which can be opened by means of a key member mounted on the fuel tanks of selected vehicles, when the dispensing line is connected to the fuel tanks of the selected vehicles.

Another object of the present invention is to provide a novel valve assembly which is adapted for use with the dispensing line of a fuel storage tank and the fuel tanks of selected motor vehicles, which is easy to operate, simple in construction, and inexpensive to manufacture.

A further object of this invention is to provide a novel valve assembly which is adapted for use with the dispensing line of a fuel storage tank and the fuel tanks of selected motor vehicles which will prevent inadvertent dispensing of wrong fuels causing undesirable mixing of diverse fuels such as oil, kerosene and gasoline in the fuel tanks of vehicles.

Other objects and advantages of the present invention will become more apparent to those persons skilled in the art, from the following description taken in conjunction with the accompanying drawings, wherein:

FIGURE 1 is a perspective view of an assembled embodiment of the present invention;

FIGURE 2 is an enlarged cross-sectional view taken along line 2—2 in FIGURE 1, illustrating the valve in the open position;

FIGURE 3 is a cross-sectional view taken along line 3—3 in FIGURE 2;

FIGURE 4 is a cross-sectional view similar to FIGURE 2, illustrating the valve in the closed position;

FIGURE 5 is a cross-sectional view taken along line 5—5 in FIGURE 4;

FIGURE 6 is a cross-sectional view taken along line 6—6 in FIGURE 2;

FIGURE 7 is a cross-sectional view taken along line 7—7 in FIGURE 2;

FIGURE 8 is an exploded view of the embodiment illustrated in FIGURES 1 through 7.

Briefly described, the present invention relates to a valve assembly comprising a first body member adapted to be connected to a fuel dispensing line and an engageable second body member which is adapted to be mounted on the fuel tanks of selected motor vehicles. The body members are provided with communicable fluid passageways providing a fluid passage means through the assembly when the body members are engaged. The first body member is provided with a valve in the passageway thereof and movable means including biasing means for maintaining the valve in the closed position. The second body member mounted on the fuel tank of the vehicle is provided with means engageable with the movable means of the first body member when the body members are engaged for rendering the movable means operable to deactivate the biasing means. The first body member further is provided with means to actuate the movable means to deactivate the biasing means thereby permitting the opening of the valve and the flow of fluid from the dispensing line through the assembly into the fuel tank of the vehicle.

Referring to the drawings, there is illustrated an embodiment of the invention. Specifically referring to FIGURE 1, there is illustrated the valve assembly 10, including a body member 11 adapted to be secured to a fuel dispensing line 12 and a body member 13, which is adapted to be mounted on a fuel line 14 of selected motor vehicles. The body member 11 consists of an upper housing member 15 and a lower housing member 16. The upper housing member 15 consists of an upper annular section 17 which is internally threaded to threadedly receive the free end of the fuel dispensing line 12, a conically shaped section 18, an intermediate annular section 19, a conically shaped section 20, an annular flaring section 21 and a lower annular section 22. The lower housing member 16 consists of an upper annular section 23, which is received at its upper end within the lower annular section 22 of the upper housing member 15, an intermediate section 24 threaded into the lower end of the upper section 23 and a lower annular portion 25 which is threaded into the lower end of intermediate section 24.

As best illustrated in FIGURES 2 and 3, the housing member 16 is carried within the housing section 15 by means of set screws 26 mounted in suitable openings in the annular section 22 of the housing member 15, having inwardly projecting portions 27 which are received within an annular groove 28 in the upper end of the upper section 23 of housing member 16. It will be seen that the housing member 16 may be rotated freely relative to the housing member 15. As best illustrated in FIGURES 2 and 5, the upper section 23 of the housing member 16 is provided with a pair of recesses 29 and 30 spaced 180° apart, which are adapted to receive a pair of spring biased balls 31 and 32, respectively, mounted in openings 33 and 34 in the annular section 22 of the upper housing member 15. It further will be seen that the spring biased balls 31 and 32 will be received in the grooves 29 and 30 to yieldably retain the housing member 16 in a fixed position relative to the housing member 15. However, by firmly gripping the housing member 15 with one hand and firmly applying pressure to rotate the housing member 16 with the other hand, the balls 31 and 32 can be retracted to permit the housing members to be rotated relative to each other.

Mounted in the housing member 15 is a valve combination 35, including a lower conical section 36 providing a valve seat 37, an intermediate annular section 38, and an upper guide section 39 spaced from the annular section 38 by means of strut elements 40. The upper section 39 is provided with an axial opening for receiving a valve stem 41 therethrough, which is provided with a valve head 42 on the lower end thereof, engageable with the valve seat 37 when the valve stem is displaced axially to open and close the valve. Depending axially from the valve head 42 is a follower element 43 having a substantially rounded surface.

The upper section 23 of housing member 16 is provided with an inwardly extending integral platform section 44 which is disposed substantially in alignment with the grooves 29 and 30 in the housing member 16, and which extends a short distance beyond the axis of the assembly. The platform section 44 is formed with an axial opening 45, having enlarged bore sections 46 and 47. Mounted in the bore sections 46 and 47 is a cam holder 48, having a diametrically disposed slot 49 in the lower end thereof and a diametrically disposed slot 50 in the upper end thereof. Mounted on the platform section 44 is a spacer plate 51 having an opening 52 aligned with the slot 50 in the cam holder 48 and an upwardly projecting abutment portion 53 which is angularly displaced relative to the centerline of the platform section 44, as best illustrated in FIGURES 3, 5 and 6. The spacer plate 51 is located and fixed in position by means of pins 54 disposed in aligned openings in the spacer plate 51 and the platform section 44.

The alignment pins 54 also locate and fix in position a cam guide 55, which is mounted on the spacer plate 51. The cam guide 55 is provided with a leg portion 56, which rests on the top portion of the spacer plate, and is supported at its opposite end on the upwardly projecting abutment portion 53 of the spacer plate to provide a spacing between the upper surface of the spacer plate and the bottom surface of the cam guide. As best illustrated in FIGURES 3, 5 and 6, the cam guide 55 is formed with a longitudinal slot 57, having an end wall 58 provided with an opening 59, and side walls 60 and 61 provided with longitudinally extending guide grooves 62 and 63. Disposed in the slot 57 of the cam guide, for movement along the length thereof, radially relative to the axis of the assembly, is a cam member 64. The cam member 64 is formed laterally projecting with flange elements 65 and 66 which are received for sliding movement within guide grooves 62 and 63, and a cam surface 67 disposed at an angle relative to the axis of the assembly, which is engageable with the follower element 43 depending from the valve 42. The extent of travel of cam member 64 is sufficient, whereupon radial movement of the cam member 64 produces a camming action between cam surface 67 and follower element 43, causing the valve 42 to seat and unseat on valve seat 37. The cam member 64 is urged into engagement with the follower element 43 by means of a spring 68 extending through the opening 59 in the end wall 58 of the slot 57, having its ends engaging and being seated in a circular recess 69 formed in the annular section 23 of housing member 16 and a circular recess 70 formed on the wall 71 of the cam member 64.

The radial movement of the cam member 64 is restricted by means of a cam member 72, which is mounted on the upper surface of the spacer plate 51. The cam member 72 is provided with a depending leg portion 73, which extends through opening 52 in the spacer plate and is fitted into the opening 50 of the cam holder 48 for movement therewith. The cam member 72 has a cam surface 74 disposed parallel to the axis of the assembly, which is engaged by a parallel surface 75 of the depending leg portion 56 of the cam member 64. The contour of the cam surface 74 is formed to permit radial displacement of the cam member 64 in slot 57 when cam member 64 is rotated relative to the axis of the assembly and the cam engaging surface 75 of cam member 64 is urged into constant engagement with cam surface 74, assuming cam member 72 to be retained in a fixed position relative to the cam member 64.

The body member 13 includes an adapter section 76 which is mountable on the free end of a fuel line 14 of the vehicle, a perforate support section 77, a cylindrically shaped, elongated perforate section 78 which is received within the lower cylindrical section 25 of the housing member 16 when the body members are connected together, a cover section 79 mounted on the adapter 76, and a key member 80. The key member 80 includes a stem portion 81 which is mounted axially within the perforate section 78 and a head portion 82 disposed at the upper free end thereof, which is received within the diametrically disposed slot 49 of the cam holder 48 when the body members 11 and 13 are connected together, as illustrated in FIGURE 2. When the body members are connected so that the head portion 82 of the key member is received within the slot 49 of the cam holder 48, the cam holder 48 and the cam member 72 are prevented from rotating and become fixed in position relative to cam member 64.

The valve member 42 normally will be in the closed position, as illustrated in FIGURE 4, with the cam member 64 being displaced radially inwardly, to its furthest extent, to bias the valve in the closed position. When the body members 11 and 13 are disconnected, so that the head portion 82 of the key member will not be inserted in the slot 49 to prevent the cam holder 48 from rotating, the lower housing member 16 can be rotated and the cam member 48 will not be caused to be displaced radially, due to the fact that the cam member 72 will rotate about the axis of the assembly, with the platform section 44, the cam holder 48, the spacer plate 51, and the cam guide 55, not permitting any relative movement between cam members 64 and 72.

However, when the body members 11 and 13 are connected, so that the head portion 82 of the key member is inserted in the slot 49 of the cam holder 48, the cam member 72 will be locked in a fixed position. Then, when the lower housing member 16 is rotated in a clockwise direction relative to FIGURE 5, there will be relative movement between the cam members and the cam surface 75 of cam member 64 will be caused to move along cam surface 74, displacing the cam member radially toward the end wall 58 of slot 57, against the action of the spring 68, thereby permitting the valve 42 to open under the influence of the fluid pressure in the upper portion of housing member 15. With the valve thus in the open position, fuel will flow through body members 11 and 13 into the fuel line 14 of the vehicle. When a desired amount of fuel has been dispensed and the members are to be disconnected, the lower housing member 16 is rotated in a counterclockwise direction relative to FIGURE 5, so that the cam surface 75 of the cam member 64 rides along the cam surface 74 of cam member 72, causing the cam member 64 to be moved away from the end wall 58 of slot 57 in the cam guide member. The cam surface 67 of cam member 64 engaging the follower element 73 then will cause the valve 42 to be moved axially into the closed position. The body members 11 and 13 can then be disconnected and a cap member 83 can be mounted on the cover member 79 to enclose the key member 80 and perforate section 78, and also close the opening in the body member 13.

The mating slot 49 and the head portion 82 of the key member can be of any suitable cooperating configuration. The configurations of these components also can be varied on with different users to avoid interchangeability between different users. It also will be appreciated that the adapter 76 can be mounted on the fuel line 14 by any suitable means including threaded and bayonet connections and the like.

It thus will be appreciated from the above description of the construction and operation of the valve assembly that by having fuel dispensing line 12 equipped with a body member 11 and a number of authorized vehicles equipped with body member 13 mounted on the fuel line 14, it would not be possible to dispense fuel from such a dispensing line to any unauthorized vehicles. Consequently, this would eliminate any possible unauthorized use or pilferage of the fuel located on the premises of the business concern.

What I claim is:

1. A valve assembly comprising engageable first and second body members, said body members having communicable fluid passageways providing a fluid passage means through said assembly when said body members are engaged, said first body member having a valve in the passageway thereof, movable means mounted on said first body member including means for biasing said valve into the closed position, operative only upon being rendered operable and actuation thereof for deactivating said biasing means, means mounted on said second body member operatively engageable with said movable means when said body members are engaged for rendering said movable means operable and means mounted on said first body members operatively engageable with said movable means for actuating the same to deactivate said biasing means when said movable means has been rendered operable.

2. A valve assembly comprising engageable first and second body members, said body members having communicable fluid passageways providing a fluid passage means through said assembly when said body members are engaged, said first body member having a valve in the passageway thereof, said first body member being communicable with a source of fluid under pressure sufficient to open said valve, movable means mounted on said first body member including means for biasing said valve in the closed position, operative upon being rendered operable and actuation thereof to deactivate said biasing means thereby permitting said valve to open under the force of said fluid, means mounted on said second body member operatively engageable with said movable means when said body members are engaged for rendering said movable means operable and means mounted on said first body member operatively engageable with said movable means for actuating said movable means when said movable means has been rendered operable.

3. A valve assembly comprising connectable first and second body members, said body members having communicable fluid passageways providing a fluid passage means through said assembly when said body members are connected together, said first body member having a valve in the fluid passageway thereof, first and second cam members mounted in said first body member, said first cam member and said valve having engageable cam surfaces operative during a predetermined relative movement between said first cam member and said valve for moving said valve between open and closed positions, said first and second cam members having engageable cam surfaces operative during a predetermined relative movement of said first and second cam members and when one of said cam members is rendered operable for effecting said first mentioned predetermined relative movement between said first cam member and said valve, means mounted on said second body member operatively engageable with said one cam member when said body members are connected together for rendering operable said one cam member to permit said second mentioned predetermined relative movement between said first and second cam members and means for moving the other of said first and second cam members while said one cam member is rendered operative for effecting said second mentioned predetermined relative movement between said first and second cam members thereby effecting said first mentioned predetermined relative movement between said first cam member and said valve.

4. A valve assembly comprising connectable first and second body members, said body members having communicable fluid passageways providing a fluid passage means through said assembly when said body members are connected together, said first body member having a valve seat in the fluid passageway thereof, a valve member mounted on said first body member engageable with said seat to open and close selectively the fluid passageway in said first body member, the fluid passageway in said first body member being communicable with a source of fluid under pressure sufficient to unseat said valve, first and second cam members mounted in said first body member, said first cam member and said valve having engageable cam surfaces operative during a predetermined relative movement between said first cam member and said valve member for moving said valve member selectively into seating engagement with said valve seat and permitting said valve to be unseated under the influence of the force of the fluid in the passageway of said first body member, said first and second cam members having engageable cam surfaces operative during a predetermined relative movement of said first and second cam members and when one of said cam members is rendered operable, for effecting said first mentioned predetermined relative movement between said first cam member and said valve, means mounted on said second body member operatively engageable with said one cam member when said body members are connected together for rendering operable said one cam member to permit said second mentioned predetermined relative movement between said first and second cam members and means for moving the other of said first and second cam members while said one cam member is rendered operative for effecting said second mentioned predetermined relative movement between said first and second cam members thereby effecting said first mentioned predetermined relative movement between said first cam member and said valve.

5. A valve assembly comprising connectable first and second body members, said body members having communicable fluid passageways providing a fluid passage means through said assembly when said body members are connected together, said first body member having a valve in the fluid passageway thereof, first and second cam members mounted in said first body member, said first cam member and said valve having engageable cam surfaces operative during a predetermined relative movement between said first cam member and said valve for moving said valve between open and closed positions, said first and second cam members having engageable cam surfaces operative during a predetermined relative movement of said first and second cam members and when one of said cam members is locked in a fixed position for effecting said first mentioned predetermined relative movement between said first cam member and said valve, means mounted on said second body member operatively engageable with said one cam member when said body members are connected together for locking said one cam member in a fixed position to permit said second mentioned predetermined relative movement and means for moving the other of said cam members while said one cam member is locked in the fixed position for effecting said second mentioned predetermined relative movement between said first and second cam members thereby effecting said first mentioned predetermined relative movement between said first cam member and said valve.

6. A valve assembly comprising connectable first and second body members, said body members having communicable fluid passageways providing a fluid passage means through said assembly when said body members are connected together, said first body member having a valve seat in the fluid passageway thereof, a valve member mounted on said first body member engageable with said seat to open and close selectively the fluid passageway in said first body member, the fluid passageway in said first body member being communicable with a source of fluid under pressure sufficient to unseat said valve member, first and second cam members mounted in said first body member, said first cam member and said valve having engageable cam surfaces operative during a predetermined relative movement between said first cam member and said valve member for moving said valve member selectively into seating engagement with said valve seat and permitting said valve member to be unseated under the influence of the force of the fluid in the passageway in said first body member, said first and second cam member having engageable cam surfaces operative during a predetermined relative movement of said first and second cam members and when one of said cam members is locked in a fixed position, for effecting said first mentioned predetermined relative movement, means mounted on said second body member operatively engageable with said one cam member when said body members are connected together for locking said one cam member in the fixed position to permit said second mentioned predetermined relative movement and means for moving the other of said cam members while said one cam member is locked in the fixed position for effecting said second mentioned predetermined relative movement thereby effecting said first mentioned predetermined relative movement.

7. A valve assembly comprising connectable first and second body members, said body members having communicable fluid passageways providing a fluid passage means through said assembly when said body members are connected together, said first body member having a valve seat in the fluid passageway thereof, a valve member mounted on said first body member engageable with said seat to open and close selectively the fluid passageway in said first body member, first and second cam members mounted in said first body member, said first cam member and said valve member having engageable surfaces operative during movement of said first cam member along a line substantially normal to the line of movement of said valve member in opening and closing, for moving said valve member into and out of seating engagement with said valve seat, said first and second cam members having engageable cam surfaces operative during a predetermined relative movement between said first and second members for moving said first cam member along said line of movement substantially normal to the line of movement of said valve member, said cam members being selectively operative to produce said predetermined relative movement, means mounted on said second body member operatively engageable with one of said first and second cam members when said body members are connected together for rendering said cam members operable to permit said predetermined relative movement and means for moving one of said cam members when said cam members are rendered operative for moving said first cam member to produce said predetermined relative movement between said cam members thereby moving said first cam member along said line of movement normal to the line of movement of said valve member.

8. A valve assembly comprising connectable first and second body members, said body members having communicable fluid passageways providing a fluid passage means through said assembly when said body members are connected together, said first body member having a valve seat in the fluid passageway thereof, a valve member mounted on said first body member engageable with said seat to open and close selectively the fluid passageway in said first body member, the fluid passageway in said first body member being communicable with a source of fluid under pressure sufficient to unseat said valve member, first and second cam members mounted in said first body member, said first cam member and said valve member having engageable surfaces operative during movement of said first cam member along a line substantially normal to the line of movement of said valve member in opening and closing, for selectively moving said valve member into seating engagement with said valve seat and permitting said valve member to be unseated under the influence of the force of the fluid in the passageway in said first body member, said first and second cam members having engageable cam surfaces operative during a predetermined relative movement between said first and second members for moving said first cam member along said line of movement substantially normal to the line of movement of said valve member, said cam member being operative to produce said predetermined relative movement only when said second cam member is locked in a fixed position, means mounted on said second body member operatively engageable with said second body member when said body members are connected together for locking said second cam member in the fixed position to permit said predetermined relative movement and means for moving said first cam member when said cam members are rendered operative for moving said first cam member to produce said predetermined relative movement between said cam members thereby moving said first cam member along said line of movement normal to the line of movement of said valve member.

9. A valve assembly comprising first and second body members, said body members having communicable fluid passageways providing a fluid passage means through said assembly when said body members are connected together, said first body member having a valve seat in the fluid passageway thereof, a valve member mounted on said first body member engageable with said seat to open and close selectively the fluid passageway in said first body member, first and second cam members mounted in said first body member, said first cam member and said valve member having engageable cam surfaces operative during a predetermined relative movement between said first cam member and said valve member for moving said valve member into and out of seating engagement with said valve seat, said second cam member having a cam surface, said first cam member having a surface engageable with the cam surface of said second cam member, said cam surface of said second cam member having a contour for effecting said first mentioned predetermined relative movement when said first cam member is moved in engagement along said cam surface and said second cam member is locked in a fixed position, means mounted on said second body member opratively engageable with said second cam member when said body members are connected together for locking said second cam member in a fixed position and means for moving said first cam member while said second cam member is locked in the fixed position.

10. A valve assembly comprising first and second body members, said body members having communicable fluid passageways providing a fluid passage means through said assembly when said body members are connected together, said first body member having a valve seat in the fluid passageway thereof, a valve member mounted on said first body member engageable with said seat to open and close selectively the fluid passageway in said first body member, the fluid passageway in said first body member being communicable with a source of fluid under pressure sufficient to open said valve, first and second cam members mounted in said first body member, said first cam member and second valve member having engageable cam surfaces operative during a predetermined relative movement between said first cam member and said valve member for selectively moving said valve member into seating engagement with said valve seat and permitting said valve to open under the influence of the force of the fluid in the passageway of said first body member, said second cam member having a cam surface, said first cam member having a surface engageable with the cam surface of said second cam member, said cam surface of said second cam member having a contour for effecting said first mentioned predetermined relative movement when said first cam member is moved in engagement along said cam surface and said second cam member is locked in a fixed position, means mounted on said second body member operatively engageable with said second cam member when said body members are connected together for locking said second cam member in a fixed position and means for moving said first cam member while said second cam member is locked in the fixed position.

11. A valve assembly comprising connectable first and second body members, said body members having communicable fluid passageways providing a fluid passage means through said assembly when said body members are connected together, said first body member having a valve seat in the fluid passageway thereof, a valve mounted on said first body member engageable with said valve seat to open and close selectively the fluid passageway in said first body member, first and second cam members mounted on said first body member, said first body member having a cam surface disposed at an angle relative to the line of movement of said valve member in opening and closing selectively the fluid passageway in said first body member, and engageable with a follower element on said valve seat, biasing means mounted in said first body member operatively engageable with said first cam member for urging the angular cam surface thereof into engagement with the follower element of said valve member for moving said valve member into engagement with said valve seat, said first cam member having a cam engaging surface, said second cam member being freely mounted on said first body member, said second cam member having a cam surface engageable with the cam engaging surface of said cam member, said cam surface of said second cam member having a contour permitting movement of said first cam member along the line of force exerted by said biasing means when said engaging surfaces of said cam members are moved relative to each other and said second cam member is locked in a fixed position, means for moving said first cam member to permit relative movement of the engaging surfaces of said cam members and means mounted on said second body member operatively engageable with said second cam member when said body members are connected together for locking said cam member in the fixed position.

References Cited

UNITED STATES PATENTS 2,893,755   7/1959   Flower _____ 251—149.3

M. CARY NELSON, Primary Examiner

W. R. CLINE, Assistant Examiner

U.S. Cl. X.R.

251—262, 348